United States Patent
Zhu et al.

(10) Patent No.: US 8,529,298 B2
(45) Date of Patent: Sep. 10, 2013

(54) ELECTRONIC CARD CONNECTOR WITH A RELEASING PORTION FOR INSERTING OR EJECTING AN ELECTRONIC CARD SMOOTHLY

(75) Inventors: Fang-Yue Zhu, Kunshan (CN); Jian-Fei Yu, Kunshan (CN); Qi-Jun Zhao, Kunshan (CN)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 420 days.

(21) Appl. No.: 12/834,019

(22) Filed: Jul. 12, 2010

(65) Prior Publication Data

US 2011/0034050 A1 Feb. 10, 2011

(30) Foreign Application Priority Data

Aug. 4, 2009 (CN) .......................... 2009 2 0307319

(51) Int. Cl.
*H01R 24/00* (2011.01)
(52) U.S. Cl.
USPC ..................................... 439/630; 439/607.22

(58) Field of Classification Search
USPC ................. 439/159, 630, 260, 325–329, 188, 439/607.22
See application file for complete search history.

(56) References Cited

U.S. PATENT DOCUMENTS

| | | | | |
|---|---|---|---|---|
| 6,095,868 | A * | 8/2000 | Hyland et al. | 439/630 |
| 6,149,466 | A * | 11/2000 | Bricaud et al. | 439/630 |
| 6,746,256 | B1 * | 6/2004 | Wang | 439/159 |
| 6,863,570 | B2 * | 3/2005 | Chen | 439/630 |
| 6,932,632 | B1 * | 8/2005 | Lai | 439/157 |
| 6,939,148 | B2 * | 9/2005 | Yu | 439/607.01 |
| 7,238,034 | B2 | 7/2007 | Matsukawa et al. | |
| 7,438,600 | B1 * | 10/2008 | Hung et al. | 439/630 |
| 7,632,117 | B1 * | 12/2009 | Van der Steen | 439/159 |
| 7,682,194 | B2 * | 3/2010 | Lin et al. | 439/630 |
| 2006/0166541 | A1 * | 7/2006 | Uchida et al. | 439/326 |

\* cited by examiner

*Primary Examiner* — Briggitte R Hammond
(74) *Attorney, Agent, or Firm* — Wei Te Chung; Ming Chieh Chang

(57) ABSTRACT

An electronic card connector defining a receiving space for receiving an electronic card, includes an insulative housing, a number of contacts retain in the insulative housing, and a metal shell covering the insulative housing. The insulative housing has a bottom wall. The metal shell has a top wall opposed to the bottom wall, and a pair of side walls. The metal shell defines a depressed portion outwardly recessed from an intersection portion of the top wall and the side wall.

12 Claims, 7 Drawing Sheets

ELECTRONIC CARD CONNECTOR WITH A RELEASING PORTION FOR INSERTING OR EJECTING AN ELECTRONIC CARD SMOOTHLY

BACKGROUND OF THE INVENTION

1. Field of the Invention

The present invention relates to electronic card connectors, more particularly to electronic card connector with a releasing portion for inserting or ejecting an electronic card smoothly.

2. Description of Related Art

Nowadays, electronic card connectors are widely used in computers, mobile phones, cameras, et al. to receive an electronic card. The electronic card presents as a media for storing documents and transmitting the documents to the computers, mobile phones, cameras via the electronic card connectors. An electronic card connector usually includes an insulative housing, a number of contacts retained on the insulative housing, an ejector retained in the insulative housing for ejecting the electronic card, and a metal shell covering the insulative housing. The insulative housing has a bottom wall and an arm portion extending upwardly from one side of the bottom wall. The arm portion defines a cavity for retaining the ejector. The metal shell has a top wall, a left side wall and a right side wall extending downwardly from left and right side edges of the top wall. The metal shell is formed with a pair of arc transitional portions respectively located at intersection portion of the top wall and the left and right side walls. The electronic card connector defines a receiving space between the bottom wall, top wall, left side wall, arm portion and arc transitional portions. The electronic card is rectangular and has four right-angle edges at two sides thereof.

Therefore, when the electronic card is inserted into or ejected from the receiving space, at least one right-angle edge of the electronic card easily rubs with the arc transitional portion of the metal shell, which make the electronic card not be inserted or ejected from the receiving space smoothly.

Hence, an improved electronic card is desired to overcome the above problems.

BRIEF SUMMARY OF THE INVENTION

According to one aspect of the present invention, an electronic card connector for mating with an electronic card, comprises: an insulative housing having a bottom wall; a plurality of contacts retain on the insulative housing; and a metal shell covering the insulative housing, the metal shell having a top wall opposed to the bottom wall, and a pair of side walls, the top wall having a lower surface and an upper surface; wherein the metal shell has a releasing portion between the top wall and the side wall, and the releasing portion has an inner surface which is outwardly offset from the lower surface along an up to down direction or an inner surface of said side wall along a transverse direction of the insulative housing.

According to another aspect of the present invention, an electronic card connector defining a receiving space for receiving an electronic card, comprises: an insulative housing having a bottom wall; a plurality of contacts retain in the insulative housing; and a metal shell covering the insulative housing, the metal shell having a top wall opposed to the bottom wall, and a pair of side walls; wherein the metal shell defines a depressed portion outwardly recessed from an intersection portion of the top wall and the side wall.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
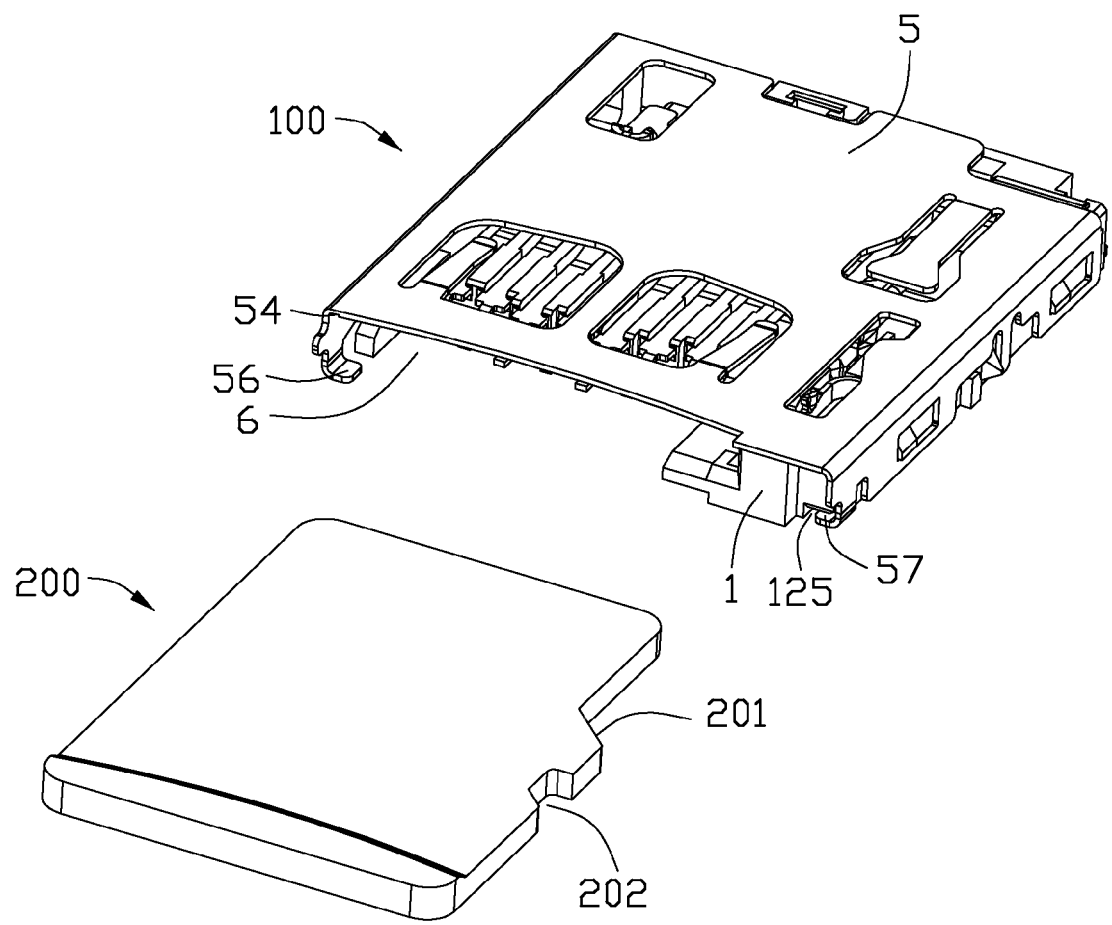
FIG. 1 is a perspective view of an electronic card connector and an electronic card according to a first embodiment of the present invention.
Figure 2:
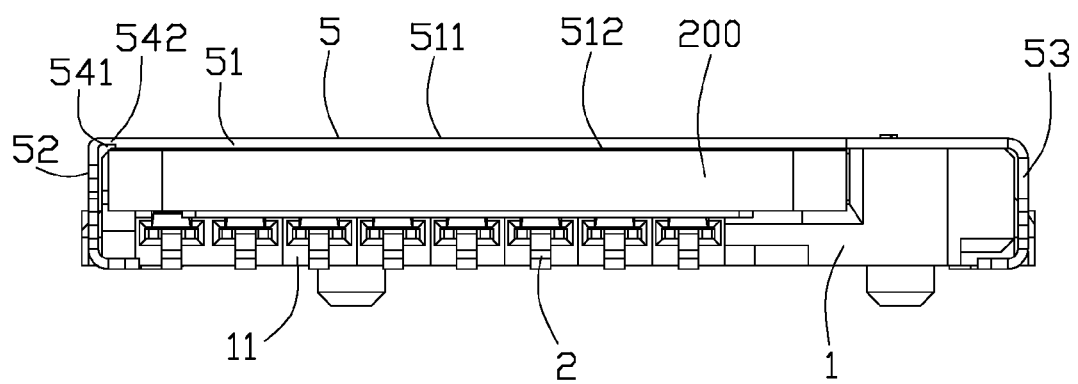
FIG. 2 is a front elevational view of the electronic card connector with the electronic card inserted therein.
Figure 3:
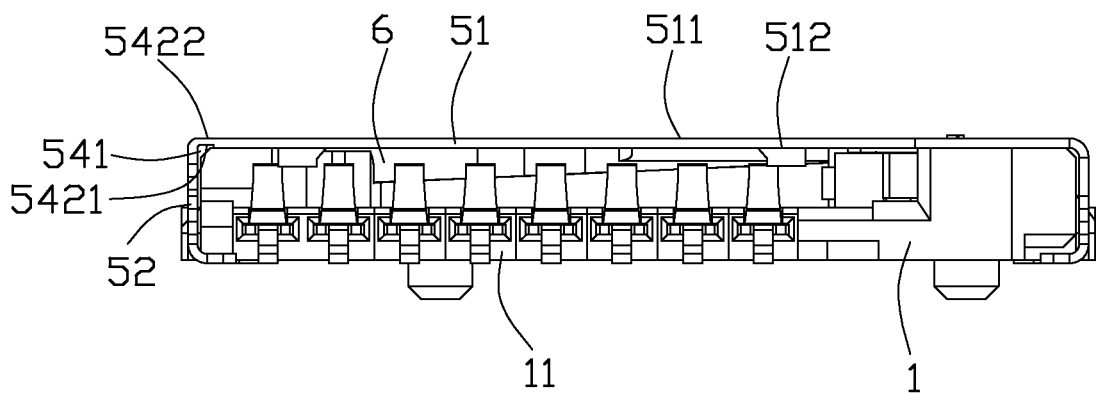
FIG. 3 is a front elevational view of the electronic card connector without any electronic card inserted therein.
Figure 4:
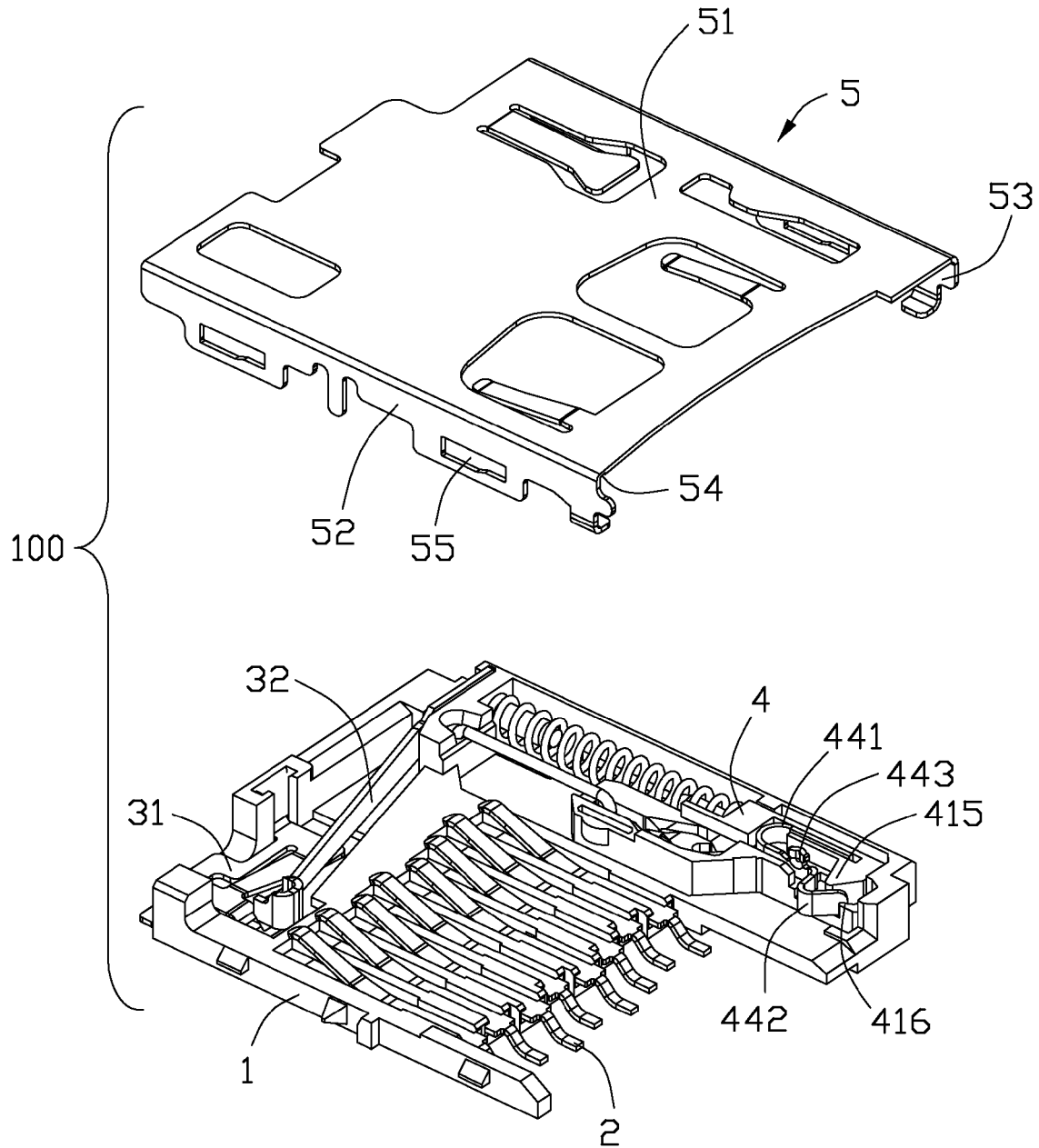
FIG. 4 is a partly exploded view of the electronic card connector shown in FIG. 1.
Figure 5:
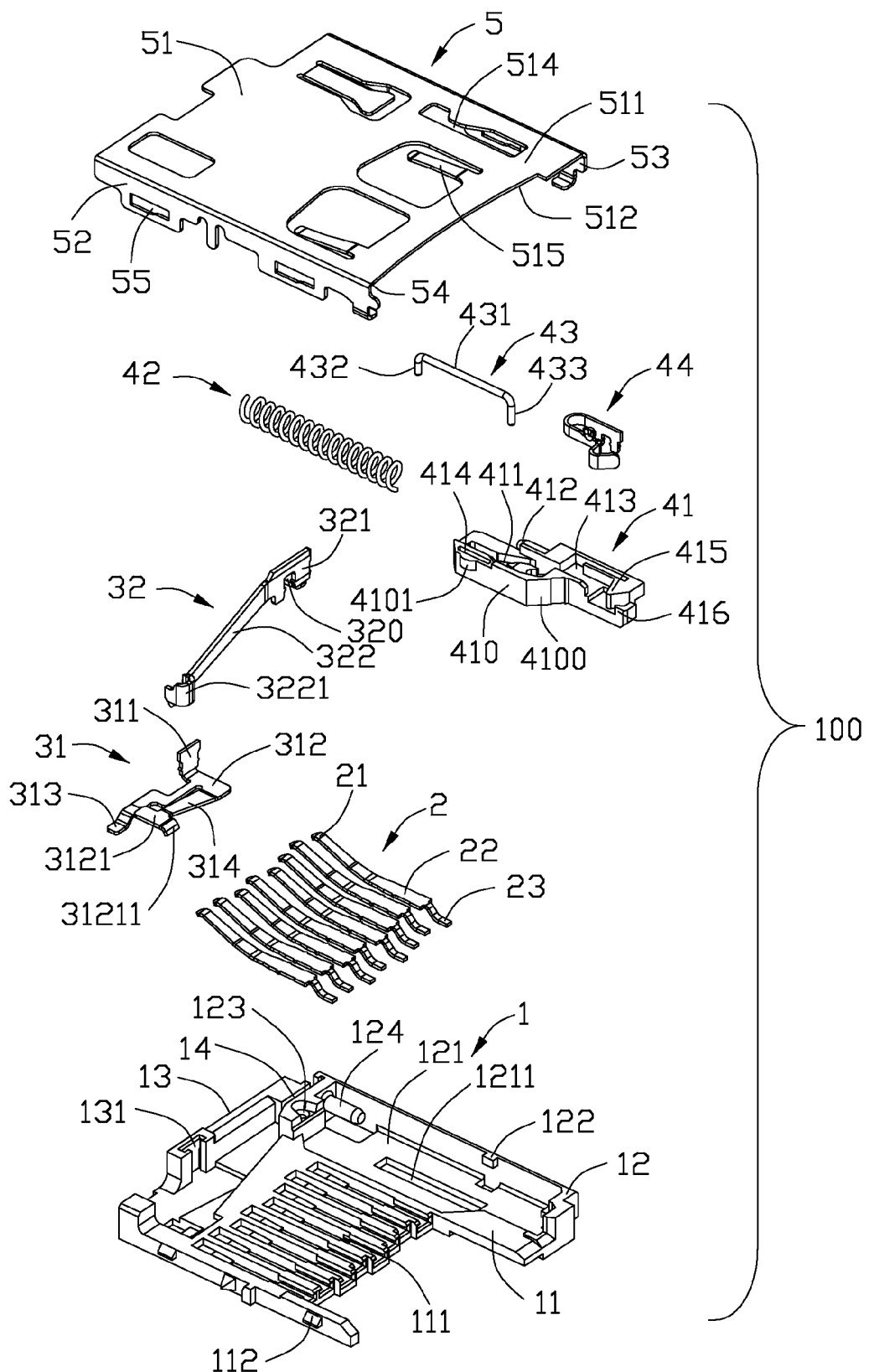
FIG. 5 is an exploded view of the electronic card connector shown in FIG. 1.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Reference will be made to the drawing figures to describe the present invention in detail, wherein depicted elements are not necessarily shown to scale and wherein like or similar elements are designated by same or similar reference numeral through the several views and same or similar terminology.

Referring to FIGS. 1-5, an electronic card connector 100 for mating with an electronic card 200 according to a first embodiment of the present invention is disclosed. The electronic card connector 100 comprises an insulative housing 1, a plurality of contacts 2 retained on the insulative housing 1, a pair of detect terminals 3 and an ejector 4 retained in the insulative housing 1 and a metal shell 5 covering the insulative housing 1. The electronic card connector 100 defines a receiving space 6 for receiving the electronic card 200. The electronic card 200 has an abutting portion 201 for abutting against the ejector 4 and a notch 202 for locking with the ejector 4. The abutting portion 201 and the notch 202 are located at one side of the electronic card 200.

Referring to FIGS. 1-4, the insulative housing 1 has a bottom wall 11, an arm portion 12 extending upwardly from one side of the bottom wall 11, and a rear wall 13 extending upwardly from a rear end of the bottom wall 11. The bottom wall 11 defines a plurality of passageways 111 extending along a front to back direction for retaining the contacts 2. The passageways 111 are arranged in a row along a transverse direction of the insulative housing 1. The bottom wall 11 has a plurality of protrusions 112 extending outwardly from two sides thereof to engage with the metal shell 5. A left front end of the bottom wall 11 is located at a rear side of a right front end of the bottom wall 11, and the right front end of the bottom wall 11 defines an aperture 125.

The arm portion 12 defines a cavity 121 recessed from a top surface thereof to receive the ejector 4, and a guiding slot 1211 extending therethrough along an up to down direction and communicating with the cavity 121. The cavity 121 and guiding slot 1211 extend along the front to back direction. The arm portion 12 has a pressing block 122 extending inwardly for pressing the ejector 4 and preventing the ejector 4 from moving upwardly. The arm portion 12 has a positioning hole 123 recessed downwardly from a rear and top end thereof, and a first post 124 is located at outside of the positioning hole 123 and extending forwardly.

The insulative housing 1 defines a fastening slot 14 extending along the transverse direction between the rear wall 13 and the rear end of the arm portion 12 to retain one of the detect terminal 3. The rear wall 13 defines a groove 131 extending downwardly from a top side thereof to retain another detect terminal 3.

Each contact 2 has a retaining portion 22 engaging with the passageways 111, a contact portion 21 extending backwardly into the receiving space 6 from a rear end of the retaining portion 22, and a soldering portion 23 extending forwardly to electrically connect with a circuit board (not shown).

The detect terminals 3 has an immovable contact 31 and a movable contact 32 moving in the front to back direction to electrically engage or disengage with the immovable contact 31.

The immovable contact 31 has a first fastening portion 311 extending along the up to down direction, a first connecting portion 312 bending forwardly from a lower end of the first fastening portion 311, a first soldering portion 313 sidewardly and backwardly extending out of the rear wall 13 of the insulative housing 1 to electrically connect with the circuit board from a rear side of the first connecting portion 312, and a first resilient strip 314 sidewardly and upwardly extending from a front end of the first connecting portion 312. The first resilient strip 314 is formed with a first conductive portion 3121 extending along the front to back direction at a left end thereof. The first conductive portion 3121 is formed with an oblique portion 31211 bending forwardly and downwardly from a front end of the first conductive portion 3121 to guide the movable contact 32 moving backwardly. The first connecting portion 312 joints to the bottom wall 11.

The movable contact 32 has a second fastening portion 321 sandwiched in the fastening slot 14, a second resilient strip 322 sidewardly and forwardly extending into the receiving space 6 from an inner end of the second fastening portion 321, and a second soldering portion 320 extending backwardly from a lower end of the second fastening portion 321 to connect with the circuit board. The second resilient strip 322 is formed with a second conductive portion 3221 at a left end thereof and protruding forwardly. The second connecting portion 322 can moves along the front to back direction to make the second conductive portion 3221 connect or disconnect with the first conductive portion 3121 along the up to down direction for examining that whether the electronic card 200 is inserted into the receiving space 6 or not.

The ejector 4 comprises a slider 41 movably retained in the cavity 121 along an inserting or ejecting direction of the electronic card 200, a spring 42 assembled between the slider 41 and a rear end of the arm portion 12, a pole 43 and a latch strip 44 retained on a front side of the slider 41.

The slider 41 defines a heart-shaped recess 411 recessed from a top surface thereof, a second post 412 extending backwardly at an outer side of the heart-shaped recess 411, and a positioning slot 413 recessed from the top surface thereof and located at a front side of the second post 412. The slider 41 defines a through hole 414 extending therethrough from a rear and inner side of thereof. Besides, the slider 41 has a side surface 410 abutting against the electronic card 200 along the transverse direction, and an inclined surface 4100 abutting against the abutting portion 201 along an oblique direction. The slider 10 is formed with an elastic portion between the side surface 410 and the through hole 414, and the elastic portion has an emboss 4101 sidewardly extending into the receiving space 6 to resist a rear side of the electronic card 200. The slider 41 further has a block extending downwardly, and the block moves in the guiding slot 1211 to guide the slider 41 moving along a predetermined direction.

The spring 42 extends along the front to back direction and has a front end fixed on the second post 412 and a rear end fixed on the first post 124. The pole 43 has a slender main portion 431 extending along the front to back direction, a first fixing portion 432 bending downwardly from a rear end of the main portion 431 to be fixed in the positioning hole 123, a second fixing portion 433 received in the heart-shaped recess 411. When the electronic card 200 is inserted in or ejected from the receiving space 6, the second fixing portion 433 moves in the heart-shaped recess 411.

The latch strip 44 has a U-shaped positioning portion 441 positioned in the positioning slot 413, and a locking portion 442 sidewardly extending into the receiving space 6 from a front end thereof to lock with the notch 202 of the electronic card 200, and an arc tab 443 extending upwardly from the positioning portion 441. The slider 41 further has a projection 415 at an outer side of the locking portion 442 for resisting the locking portion 442 and preventing the locking portion 442 from being overly deformed, and a warden portion 416 at an inner side of the locking portion 442 for preventing the locking portion 442 from overly rebounding.

The metal shell 5 has a top wall 51 extending horizontally and opposed to the bottom wall 11 of the insulative housing 1, a left side wall 52, and a right side wall 53 extending downwardly from a right side of the top wall 51, and a releasing portion 54 connecting a top end of the left side wall 52 and a left side of the top wall 51. The receiving space 6 is formed by the top wall 51, bottom wall 11, left side wall 52, arm portion 12 and the rear wall 13. The top wall 51 defines a slit 514 extending therethrough along the up to down direction and a pair of spring arms 515 extending backwardly to resisting a top side of the electronic card 200. The arc tab 443 can move in the slit 514 along the front to back direction. The top wall 51 has an upper surface 511 and a lower surface 512 respectively located at upper and lower sides thereof. The left and right side walls 52, 53 each defines a plurality of locking holes 55 to lock with the protrusions 112. The metal shell 5 has a left pad 56 extending inwardly from a front and lower end of the left side wall 52 to be soldered on the circuit board, and a right pad 57 extending toward the left pad from a front and lower end of the right side wall 53 to be soldered on the circuit board too. The left pad 56 and right pad 57 are located at a same plane and a same line along the transverse direction. The left pad 56 is located at front of the left front end of the bottom wall 11, and the right pad 57 is received in the aperture 125 and not contact with the insulative housing 1, therefore, the insulative housing 1 would not be destroyed in a soldering process of the left and right pads 56, 57.

The releasing portion 54 defines a depressed portion 541 upwardly recessed from a lower side thereof, and a cap 542 covering the depressed portion 541 from a top side. The depressed portion 541 communicates with the receiving space 6 along the up to down direction, and located at an upper side of the receiving space 6. The depressed portion 541 extends through the metal shell 5 along the front to back direction. The cap 542 has an inner surface 5421 and an outer surface 5422 respectively at upper and lower sides thereof. The inner surface 5421 is located at an upper side of the lower surface 512 along an up to down direction. While the outer surface 5422 and the upper surface 511 are located at a same plane. Therefore, the cap 542 defines a thickness which is smaller than that of the top wall 51 along the up to down direction.

As fully described above, the cap 542 present as a transitional portion between the left side wall 52 and the top wall 51, and an inner surface 5421 of the cap 542 is located at an outer side of the lower surface 512 via the depressed portion 541 upwardly recessed. Therefore, the cap 542 keeps clear of a right-angle edge of the electronic card 200 via the depressed portion 541, then in an inserting or ejecting process of the electronic card 200, the right-angle edge of the electronic card 200 can not rub with the transitional portion 542 between the left side wall 52 and the top wall 51, and the electronic card 200 can be inserted into or ejected from the receiving space 6 smoothly.

Figure 6:
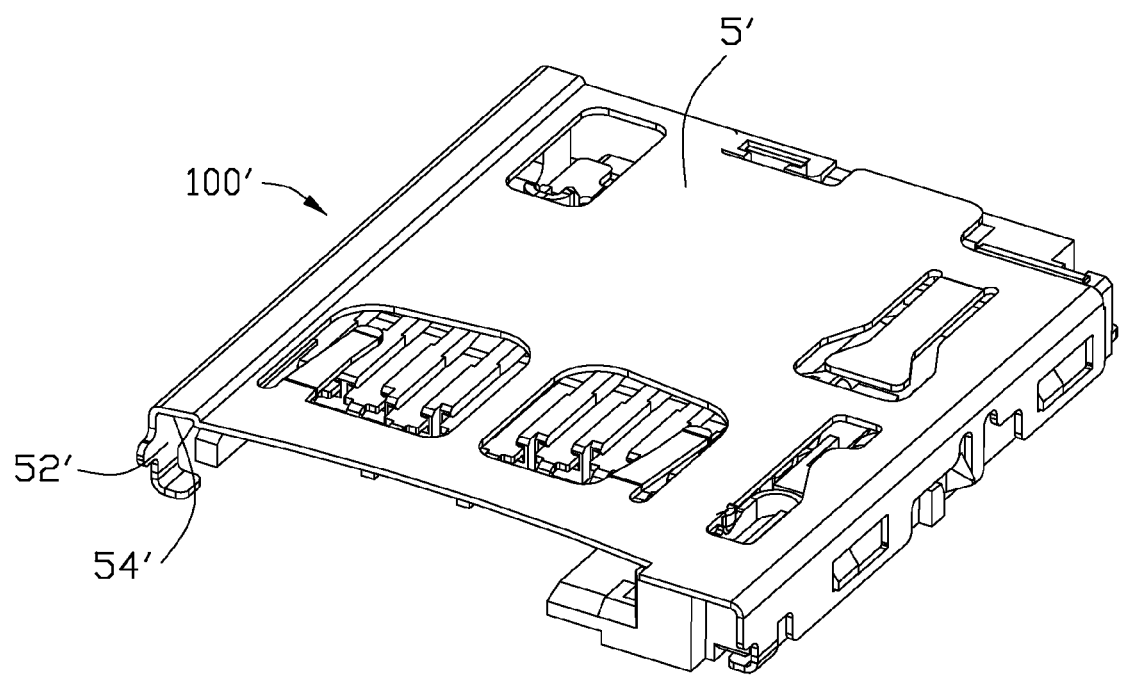
FIG. 6 is a perspective view of an electronic card connector according to a second embodiment of the present invention.
Figure 7:
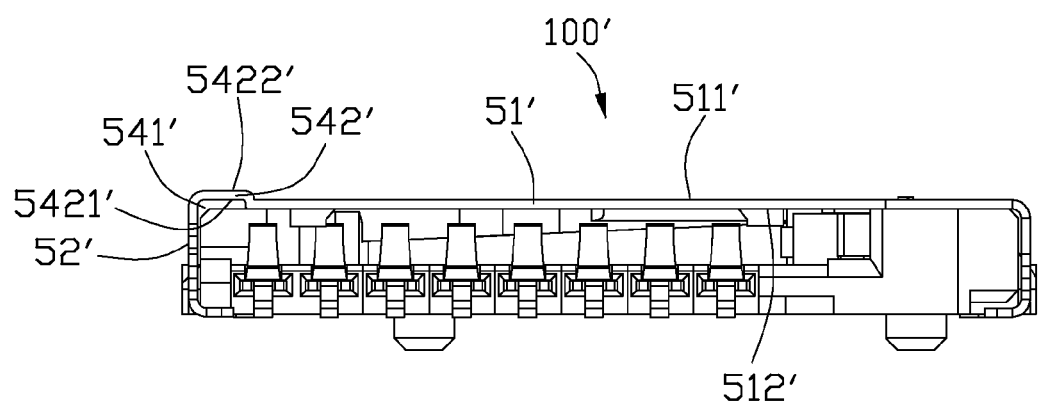
FIG. 7 is a front elevational view of the electronic card connector shown in FIG. 6.

Referring to FIGS. 6 and 7, an electronic card connector 100' according to a second embodiment in the present invention is disclosed. The electronic card connectors 100, 100' in the first and second embodiment are approximately similar to each other, and the difference is that: a whole releasing portion 54' between the top wall 51' and the left side wall 52' is raised from the top wall 51'; the releasing portion 54' also has a depressed portion 541' and a cap 542' covering the depressed portion 541', and an inner surface 5421 of the cap 542' is higher than the lower surface 512 of the top wall 51', and an outer surface 5422' of the cap 542' is also higher than the upper surface 511 of the top wall 51'; and the cap 542' defines a thickness which is same to that of the top wall 51'.

Therefore, the cap 542' in the second embodiment of the present invention presents as a raised transitional portion between the left side wall 52' and the top wall 51', and a right-angle edge of the electronic card 200 is kept clear of the raised transitional portion 542' between the left side wall 52' and the top wall 51' via the depressed portion 541'. Therefore, in an inserting or ejecting process of the electronic card 200, the right-angle edge of the electronic card 200 also can not rub with the transitional portion 542' between the left side wall 52' and the top wall 51', and the electronic card 200 can be inserted into or ejected from the receiving space 6' smoothly.

Besides, the releasing portions 54, 54' are located at a left side of the top wall 51, 51' in the first and second embodiments of the present invention, of course, the releasing portion can be alternatively designed at a top end of the left side wall, and the cap and the depressed portion are located at an left side of the receiving space; the depressed portion communicates with the receiving space along the transverse direction; an inner surface of the cap is located at a left side of an inner surface of the left side wall; then the right-angle edge of the electronic card 200 also can not rub with the cap via the depressed portion, and the electronic card 200 also can be inserted into or ejected from the receiving space smoothly.

In addition, the depressed portion also can be alternatively designed to be outwardly recessed from an intersection of the top wall and the left side wall, and the cap is located at an outer side of the depressed portion to cover the depressed portion; then the right-angle edge of the electronic card 200 also can not rub with the cap via the depressed portion, and the electronic card 200 also can be inserted into or ejected from the receiving space smoothly.

Therefore, either the inner surface 5421, 5421' of the cap 542, 542' is outwardly offset from the lower surface 512, 512' or an inner surface of the left side wall, the right-angle edge of the electronic card 200 can not rub with the cap via the depressed portion, and the electronic card 200 can be inserted into or ejected from the receiving space smoothly.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. An electronic card connector for mating with an electronic card, comprising:

an insulative housing having a bottom wall;

a plurality of contacts retained on the insulative housing; and a metal shell covering the insulative housing, the metal shell having a top wall opposed to the bottom wall, and a pair of side walls, the top wall having a lower surface and an upper surface;

wherein the shell and the insulative housing cooperatively define a receiving space with a front inserting port in a front-to-back direction, the metal shell has a releasing portion, the releasing portion has a depressed portion, which is recessed from an inner side of a corner of the top wall and one of the side walls to enlarge a space of a corresponding corner of the inserting port;

wherein the receiving space is disposed between the top wall, and the bottom wall for receiving the electronic card, and the depressed portion communicates with the inserting port;

wherein the insulative housing has an arm portion extending upwardly from one side of the bottom wall and a rear wall extending upwardly from a rear end of the bottom wall, and the side walls of the metal shell comprise a left side wall opposed to the arm portion and a right side wall covering the arm portion, and the receiving space is formed by the top wall, bottom wall, left side wall, arm portion and the rear wall;

wherein the electronic card connector further comprises a pair of detect terminals retained at a rear side of the insulative housing, the detect terminals has an immovable contact and a movable contact, and the immovable contact has a first fastening portion extending along the up to down direction and retained in the rear wall, a first connecting portion bending forwardly from a lower end of the first fastening portion, a first soldering portion and a first resilient strip respectively sidewardly extending from rear and front sides of the first connecting portion, and the movable contact has a second fastening portion, a second resilient strip sidewardly and forwardly extending into the receiving space from an inner end of the second fastening portion, and a second soldering portion extending backwardly from a lower end of the second fastening portion, the second resilient strip moves backwardly to contact with the first resilient strip along the up to down direction when the electronic card is inserted into the receiving space.

2. The electronic card connector as claimed in claim 1, wherein the bottom wall has a plurality of protrusions at two sides thereof, the side walls of the metal shell defines a plurality of locking holes to lock with the protrusions.

3. The electronic card connector as claimed in claim 1, wherein the bottom wall has a left and a right extending parts extending forwardly from opposite ends thereof and the left one is shorter than the right one, and the bottom wall defines an aperture at the right front end thereof, and metal shell has a pair of pads extending inwardly from a front end of the side walls, and one pad is located at front of the left front end and another pad is received in the aperture.

4. The electronic card connector as claimed in claim 1, wherein the depressed portion extend through the metal shell along a front to back direction.

5. The electronic card connector as claimed in claim 4, wherein the releasing portion has a cap covering the depressed portion from an outer side, and the inner surface is at an inner side of the cap, and the cap also has an outer surface at an outside thereof, and the outer surface is coplanar with the upper surface of the top wall or an outer surface of the side wall.

6. The electronic card connector as claimed in claim 4, wherein the releasing portion has an outer surface which is outwardly offset from the upper surface of the top wall or an outer surface of the side wall.

7. An electronic card connector defining a receiving space for receiving an electronic card, comprising:
   an insulative housing having a bottom wall;
   a plurality of contacts retain in the insulative housing; and
   a metal shell covering the insulative housing, the metal shell having a top wall opposed to the bottom wall, and a pair of side walls;
   wherein the metal shell defines a depressed portion outwardly recessed from an intersection portion of the top wall and the side wall, the receiving space defines an inserting port in a front-to-back direction, and the depressed portion defines a corner of the inserting port; the receiving space is located between the top wall, bottom wall and two side walls, and the depressed portion communicates with the receiving space, the metal shell is formed with a cap at an outer side of the depressed portion, the cap also protrudes outwardly from the intersection portion of the top wall and the side wall, and the cap defines a thickness which is same to that of the top wall or the side wall.

8. An electrical card connector for use with an electronic card, comprising:
   an insulative housing defining a card mating surface;
   a metallic shell attached to the housing, said shell including a primary wall oppositely facing the card mating surface in a vertical direction, and a pair of opposite side walls unitarily extending from two opposite edges of the primary wall in said vertical direction; and
   a card receiving cavity being defined among the opposite primary wall and card mating face, and the opposite side walls for receiving said electronic card, the primary wall defining a horizontal interior surface facing toward the card receiving cavity in the vertical direction for intimate engagement with the electronic card in said vertical direction, and each of said side walls defining a vertical interior surface facing toward the card receiving cavity in a transverse direction perpendicular to said vertical direction for intimate engagement with the electronic card in the transverse direction; wherein
   an intersection corner region between the primary wall and one of the side walls defines a curved exterior face, and at least one of said horizontal interior surface and said vertical interior surface defines a recess away from the card receiving cavity around said intersection corner region, wherein said recess extends along a front-to-back direction with essentially a full length of the primary wall in said front-to-back direction.

9. The electrical card connector as claimed in claim 8, wherein no curved interior face exists around said intersection corner region corresponding to said curved exterior face along said front-to-back direction.

10. The electrical card connector as claimed in claim 8, wherein the primary wall defines a horizontal exterior surface opposite to the horizontal interior surface in said vertical direction, and each of the side walls defines a vertical exterior surface opposite to the corresponding interior surface in said transverse direction.

11. The electrical card connector as claimed in claim 10, wherein the recess is defined on the horizontal interior surface under condition that the corresponding horizontal exterior surface keeps flat.

12. The electrical card connector as claimed in claim 10, wherein the recess is defined on the horizontal interior surface under condition that the corresponding horizontal exterior surface defines an offset section corresponding to said recess around the intersection corner region.

\* \* \* \* \*